United States Patent [19]

Logsdon

[11] 4,088,149
[45] May 9, 1978

[54] CHECK VALVE STRUCTURE FOR USE IN DRAINS

[76] Inventor: Duane D. Logsdon, 1708 Calavera Dr., Fullerton, Calif. 92631

[21] Appl. No.: 688,139

[22] Filed: May 20, 1976

[51] Int. Cl. .......................... F16k 31/22; F16k 33/00
[52] U.S. Cl. ........................................ 137/433; 4/287; 137/454.2; 138/89
[58] Field of Search ............ 137/202, 430, 433, 454.2; 138/89; 4/287, 295

[56] References Cited

U.S. PATENT DOCUMENTS

| | | | |
|---|---|---|---|
| 1,423,679 | 7/1922 | Pavitchich | 137/433 |
| 1,753,724 | 4/1930 | Shaw | 137/433 |
| 2,184,634 | 12/1939 | Crickmer et al. | 138/89 X |
| 2,531,721 | 11/1950 | Brock | 137/433 |
| 2,758,664 | 8/1956 | Koenig | 137/433 |
| 2,773,619 | 12/1956 | Moeller | 4/295 |
| 2,787,376 | 4/1957 | Coulson | 137/433 |
| 2,977,992 | 4/1961 | Jensen | 138/89 |
| 2,993,616 | 7/1961 | Carlile, Jr. et al. | 138/89 |
| 3,542,059 | 11/1970 | Blanchard et al. | 137/433 |
| 3,768,505 | 10/1973 | Benke | 137/433 |
| 3,958,591 | 5/1976 | Hansel et al. | 137/433 |

*Primary Examiner*—Martin P. Schwadron
*Assistant Examiner*—G. L. Walton
*Attorney, Agent, or Firm*—Edward D. O'Brian

[57] ABSTRACT

A check valve structure for use in a drain such as a floor or pavement drain can be constructed utilizing an annular elastomeric member positioned between two rigid end plates. These plates are connected so that they can be moved toward one another when they and the member are inserted in a drain or drain housing in order to compress the member to cause the member to expand in outer diameter into contact with the interior of the drain or drain housing in order to mount the structure in an operative position. A valve seat is located on the lower plate and a buoyant valve member is movably supported on the upper plate so as to be capable of being moved with respect to the valve seat. In the event of accumulation of water in the drain or drain housing or in the event of back flow into the drain or drain housing the valve member will move against the seat.

1 Claim, 3 Drawing Figures

U.S. Patent    May 9, 1978    4,088,149
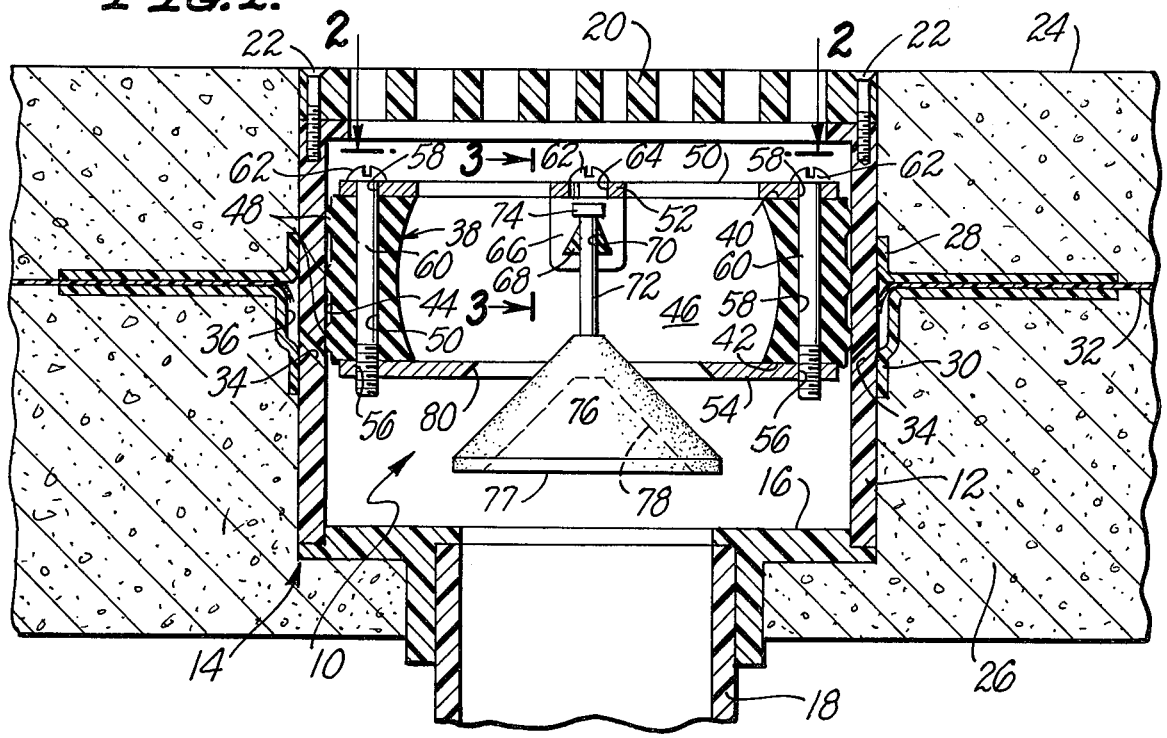
Fig. 1.
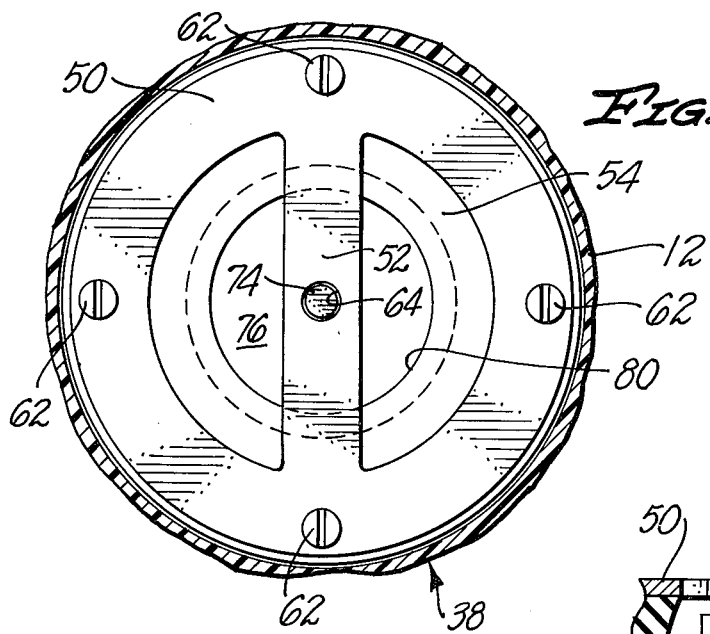
Fig. 2.
Fig. 3.

CHECK VALVE STRUCTURE FOR USE IN DRAINS

BACKGROUND OF THE INVENTION

The invention set forth in this specification pertains to new and improved check valves. It is primarily directed toward check valves which are specially adapted to be installed within drains such as floor or pavement type drains.

Such drains are normally constructed so as to utilize either a housing leading to an appropriate outlet pipe or a portion of such a pipe beneath a surface to be drained to hold a perforate plate serving to prevent comparatively large objects from entering such a drain. On occasion back flow may occur into such drains. Whenever such back flow occurs there is a degree of danger of a health hazard. Further, whenever such back flow occurs there is the distinct possibility of damage to any item or items located on a floor or pavement adjacent to such a drain. As a consequence of this there is an increasing recognition of the desirability of utilizing check valves in connection with floor, pavement and similar drains in order to prevent back flow.

It is considered that conventional check valves are not reasonably adapted for use in such drains for any one of a variety of different reasons. Such conventional check valves may be constructed in many different ways. As they are normally constructed they utilize specially formed valve or valve housing parts or components which cannot readily be installed within a drain or drain structure already located in a floor or pavement without significant difficulty. Although it is possible to especially construct drains or drain structures to be used with known types of check valves this is not considered desirable for economic reasons, and in addition, it is frequently desirable to install a check valve within an already existing or installed drain or drain structure.

SUMMARY OF THE INVENTION

As a consequence of these factors it is believed that there is a need for new and improved check valves and, more specifically, that there is a need for new and improved check valves which are especially adapted to be installed within drain pipes or housings which are located within a floor, pavement or similar surface. A broad objective of the present invention is to fulfill this need.

The invention is intended to provide check valves for the purpose indicated which are comparatively simple structures capable of being constructed at a comparatively nominal cost. The invention is also intended to provide check valves as indicated which may be easily, conveniently and rapidly installed in an operative location with a minimum of difficulty. The latter are considered to be quite important because of labor costs. The invention is also intended to provide check valves which are desirable because they are capable of adequately serving their intended purpose over a prolonged period with little or no maintenance.

In accordance with this invention these objectives of the invention are achieved by providing a check valve structure comprising: an annular elastomeric member having upper and lower ends, this member being of such a diameter that in an uncompressed condition it is capable of fitting within the interior of a drain so as to extend across such interior with its periphery located closely adjacent to the interior of the drain; rigid upper and lower annular end plates located against the upper and lower ends of the elastomeric member, respectively; connecting means for moving the end plates toward one another so as to expand the elastomeric member in order to hold it within the interior of a drain; valve seat means for use in closing off the interior of the lower end plate located on the lower end plate; support means located on the upper end plate for use in supporting a valve member; and a buoyant valve member capable of seating against the valve seat means movably mounted on the support means.

BRIEF DESCRIPTION OF THE DRAWING

The nature of a check valve in accordance with this invention is best more fully indicated with reference to the accompanying drawing in which:

FIG. 1 is a side elevational view of a presently preferred embodiment or form of a check valve in accordance with the invention installed in a cylindrical valve housing;

FIG. 2 is a partial cross-sectional view taken at line 2—2 of FIG. 1; and

FIG. 3 is a partial cross-sectional view taken at line 3—3 of FIG. 1.

The particular check valve illustrated embodies certain operative concepts and principles as are set forth and defined in the appended claims. It is considered that these operative concepts or principles can be utilized in a number of somewhat differently constructed and/or differently appearing check valves through the use or exercise of routine design skill in the plumbing industry.

DETAILED DESCRIPTION

In the drawing there is shown a check valve 10 which is installed within a generally cylindrical wall 12 of a drain housing 14 having a bottom 16 leading to a drain pipe 18. It is to be understood that a portion of a pipe of an appropriate diameter can be utilized directly as a housing 14 in connection with the valve 10. In the structure shown in the drawing this housing 14 includes a perforate top plate 20 or strainer designed to prevent the entrance of comparatively large particles into the housing 14. This plate 20 may be secured in place in any convenient manner such as, for example, through the use of screws 22.

This plate 20 should be located so as to be flush with the surface 24 of concrete or other related flooring or paving 26. In the preferred use of the present invention projecting flanges or stabilizers 28 and 30 are adhered to the exterior of the housing 14 as, for example, through the use of a conventional adhesive or a press fit and these stabilizers 28 are utilized to hold an appropriate plastic film 32 which extends within the paving 26 so as to provide a water barrier. If desired weep holes 34 may be provided so as to lead from an internal annular cavity 36 between the stabilizer 30 and the wall 12 in order to drain any moisture from between the stabilizers 28 and 30 and the wall 12 into the interior of the housing 14.

The check valve 10 is constructed so as to utilize an annular elastomeric member 38 having an upper end 40, a lower end 42, a cylindrical peripheral wall 44 and a curved, generally barrel-shaped hollow interior 46. Probably this member 38 also includes a plurality of extending annular sealing flanges or rings 48 located on its wall 44 so as to extend from this wall 44. An annular rigid upper end plate 50 is located against the upper end 40. For convenience of construction a support bar 52 is formed integrally with the plate 50 and extends in a diameter-like manner across the interior of this plate 50.

A rigid annular lower end plate 54 is located against the lower end 42. This lower end plate 54 is provided with internally threaded holes 56 which are aligned with corresponding holes 58 in the member 30 and in the upper end plate 52. Conventionally headed fasteners 60 extend through the holes 58 and are threaded within the holes 56 so that the heads 62 of the fasteners 60 are accessible from the exterior of the housing 14 when the plate 20 is removed. These fasteners 60 constitute connecting means which physically connect the plates 50 and 54 so that the member 38 is held between these two plates 50 and 54.

Preferably the member 38 is dimensioned so that prior to use when it is not under compression it and assemblage of various parts attached and connected to it may be inserted to a desired depth as illustrated within the housing 14 in such a manner as to be spaced from the bottom 16 and so as not to cover the weep holes 34. Preferably the rings 48 and the peripheral wall 44 are dimensioned to fit closely against the interior of the wall 12 in such a manner that the noted assemblage can be moved manually without difficulty, and in such a manner that the friction between the rings 48 will hold this assemblage in a desired position as it is manipulated in position.

As this member 38 fits closely adjacent to the interior of the wall 12 in this manner, the heads 62 of the fasteners 60 may be appropriately manipulated so as to apply compression through the plates 50 and 54 against the ends 40 and 42 of the member 48. This compression will tend to cause outwardly expansion of the member 38 manifested by an increase in the diameter of the peripheral wall 44 and the rings 48. Such expansion will serve to permanently mount and hold the member 38 and the various connected and attached parts roughly in the middle of the housing 14.

Because of the shape of the interior 46 of the member 38 it is considered that the peripheral wall 44 will tend to bow outwardly between the ends 40 and 42 so as to achieve a very satisfactory holding action. Because of the tendency of elastomeric materials such as will normally be utilized in forming the member 38 to creep and cold flow when held under compression, it is considered that the holding action achieved between the member 38 and the wall 12 will not only be initially satisfactory but will tend to improve with time.

In the valve 10 the bar 52 is provided with a centrally located hole 64. It also carries dependent brackets 66 which are connected by a cross bar 68 extending parallel to the bar 52. Another hole 70 is located in this cross bar 68 in alignment with the hole 64. This hole 70 carries an elongated shaft-like stem 72 having a headed upper end 74 which normally rests against the bar 68. The hole 64 is of such dimension that the end 74 may freely pass through it as the valve 10 is operated. The hole 70 acts essentially as a guide or bearing permitting linear movement of the stem 72 in such a manner that this stem 72 can only move upwardly so that the end 74 passes through the hole 64.

This stem 72 carries a hollow conical, elastomeric valve member 76 having an open bottom 77 in such a manner that the valve member 76 is pointed upwardly and is arranged co-axially with the stem 72. In effect this stem 72 is a part of the member 76. Preferably this valve member 76 is formed out of a buoyant material— i.e., a material having less density than water—but it may also be formed of any common elastomeric material. The particular shape of the valve member 76 illustrated has been chosen for several reasons. Air will normally be trapped within the interior 78 of this valve member 76 if water should rise upwardly from the bottom 16 of the housing 14. The trapped air within the interior 78 will tend to cause the valve member 76 to float upwardly to a position in which it fits against a conical valve seat 80 formed in the lower end plate 74.

This seat 80 is of the same internal configuration as the exterior (not separately numbered) of the valve member 76 so that a good fit will be achieved during the use of the valve 10 as a check valve. Because of the flexibility of material within the valve member 76 it will deform to some reasonable extent as it is used to obtain a valving action so as to minimize the effect of contaminants on its surface or the like tending to prevent a satisfactory seal being obtained against the seat 80. Because of the shape and orientation of the valve member 76 any water flow in a "normal" direction through the housing 14 will tend to impinge against this valve member 76 so as to tend to wash off of it any accumulations which might interfere with the desired operation.

It will be realized that a number of different changes and modifications can be made in the described structure without departing from the mode of operation indicated. As an example of this the valve seat 80 may be a separate part secured to the end plate 54. This is not normally desired since an economy of manufacture results from making the seat 80 integral with the plate 54. Similarly, it would be possible to bevel the lower plate 54 in such a manner as to preclude any possibility of water accumulating on this plate. Expedients of this type are not considered necessary because with the construction shown, any possible accumulation of water within the interior of the housing 14 is minimal.

I claim:
1. A check valve structure which comprises:
an annular elastomeric member having upper and lower ends, said member in an uncompressed condition having a cylindrical peripheral wall and a plurality of sealing rings extending from said wall and extending completely around said member, said sealing rings being spaced from one another, said member in an uncompressed condition being capable of fitting within the interior of a drain so as to extend across the interior of a drain with said sealing rings engaging the interior of the drain so as to hold said structure in place,
a rigid upper annular end plate located against the upper end of said elastomeric member,
a rigid lower annular end plate located against the lower end of said elastomeric member,
fasteners extending between said end plates for moving said end plates toward one another in order to apply compression to said elastomeric member in order to cause expansion of the exterior of said elastomeric member into sealing engagement with the interior of the drain, said fasteners being spaced around the interior of said member,
valve seat means for use in closing off the interior of said lower end plate located on said lower end plate,
support means located on said upper end plate for use in supporting a valve member, said support means including guide means for controlling the movement of a stem, and an upwardly directed conical, elastomeric buoyant valve member having a hollow interior and an open bottom extending across the lower end of said valve member, said valve member being capable of seating against said valve seat means movably mounted on said support means so as to be capable of being moved from a normally open position spaced from said valve seat means to a closed position in contact with said valve seat means, said valve member including a stem extending therefrom through said guide means, said stem having an enlarged head normally engaging said support means so as to hold said valve member with respect to said support means and said valve seat.

* * * * *